US011615105B2

United States Patent
Levine et al.

(10) Patent No.: US 11,615,105 B2
(45) Date of Patent: *Mar. 28, 2023

(54) ASYNCHRONOUS SEARCH FOR BIG OBJECTS

(71) Applicant: salesforce.com, inc., San Francisco, CA (US)

(72) Inventors: Eli Levine, San Francisco, CA (US); Jonathan Bruce, San Rafael, CA (US)

(73) Assignee: salesforce.com, inc., San Francisco, CA (US)

( * ) Notice: Subject to any disclaimer, the term of this patent is extended or adjusted under 35 U.S.C. 154(b) by 412 days.

This patent is subject to a terminal disclaimer.

(21) Appl. No.: 16/442,409

(22) Filed: Jun. 14, 2019

(65) Prior Publication Data

US 2019/0303352 A1 Oct. 3, 2019

Related U.S. Application Data

(63) Continuation of application No. 14/542,342, filed on Nov. 14, 2014, now Pat. No. 10,366,056.
(Continued)

(51) Int. Cl.
*G06F 16/00* (2019.01)
*G06F 16/2458* (2019.01)
(Continued)

(52) U.S. Cl.
CPC .......... *G06F 16/2471* (2019.01); *G06F 16/20* (2019.01); *G06F 16/245* (2019.01);
(Continued)

(58) Field of Classification Search
CPC .......... G06F 16/18; G06F 16/21; G06F 16/20; G06F 16/214; G06F 16/211;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Dean, Jeffrey, and Sanjay Ghemawat. "MapReduce: simplified data processing on large clusters." Communications of the ACM 51.1 (2008): 107-113. (Year: 2008).
(Continued)

*Primary Examiner* — Paul Kim
(74) *Attorney, Agent, or Firm* — Kwan & Olynick LLP

(57) ABSTRACT

Techniques and systems for completing a database query. A time to complete a synchronous query in response to receiving an original database query is estimated by a database management system provided by one or more computing devices. A synchronous database query corresponding to the original database query is performed with the database management system if the estimated time to complete the synchronous query is less than a pre-selected threshold time. One or more asynchronous queries corresponding to the original database query are performed with the database management system if the estimated time to complete the synchronous query is greater than the pre-selected threshold time. A result, whether from a synchronous query or one or more asynchronous queries, is stored in an object within a non-relational database system.

21 Claims, 4 Drawing Sheets

Related U.S. Application Data

(60) Provisional application No. 61/904,822, filed on Nov. 15, 2013, provisional application No. 61/904,826, filed on Nov. 15, 2013, provisional application No. 61/905,439, filed on Nov. 18, 2013, provisional application No. 61/905,457, filed on Nov. 18, 2013, provisional application No. 61/905,460, filed on Nov. 18, 2013.

(51) Int. Cl.
  *G06F 16/25* (2019.01)
  *G06F 16/27* (2019.01)
  *G06F 16/245* (2019.01)
  *G06F 16/28* (2019.01)
  *G06F 16/20* (2019.01)
  *G06F 16/21* (2019.01)
  *G06F 16/18* (2019.01)

(52) U.S. Cl.
  CPC ............ *G06F 16/25* (2019.01); *G06F 16/258* (2019.01); *G06F 16/27* (2019.01); *G06F 16/284* (2019.01); *G06F 16/18* (2019.01); *G06F 16/21* (2019.01); *G06F 16/211* (2019.01); *G06F 16/214* (2019.01); *G06F 16/217* (2019.01); *G06F 16/219* (2019.01); *G06F 16/256* (2019.01); *G06F 16/289* (2019.01)

(58) Field of Classification Search
  CPC .... G06F 16/219; G06F 16/217; G06F 16/284; G06F 16/256; G06F 16/27; G06F 16/25; G06F 16/2471; G06F 16/289; G06F 16/245; G06F 16/258
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,884,299 A | 3/1999 | Ramesh et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,197,520 B1 | 3/2007 | Matthews et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,958,159 B1 | 6/2011 | Tran et al. |
| 9,104,762 B1 | 8/2015 | Ward |
| 9,143,341 B2 | 9/2015 | Harrang et al. |
| 9,785,643 B1 | 10/2017 | Patil et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0038313 A1 | 3/2002 | Klein et al. |
| 2002/0042264 A1 | 4/2002 | Kim |
| 2002/0042843 A1 | 4/2002 | Diec |
| 2002/0069077 A1 | 6/2002 | Brophy et al. |
| 2002/0072951 A1 | 6/2002 | Lee et al. |
| 2002/0082892 A1 | 6/2002 | Raffel et al. |
| 2002/0087552 A1 | 7/2002 | Applewhite et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120625 A1 | 6/2003 | Jackson et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0229610 A1 | 12/2003 | Treeck |
| 2004/0001092 A1 | 1/2004 | Rothwein et al. |
| 2004/0010489 A1 | 1/2004 | Rio |

(56) References Cited

U.S. PATENT DOCUMENTS

| | | |
|---|---|---|
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0149718 A1 | 7/2005 | Berlin |
| 2009/0177744 A1 | 7/2009 | Marlow et al. |
| 2009/0222404 A1 | 9/2009 | Dolin et al. |
| 2010/0121941 A1 | 5/2010 | Harrang et al. |
| 2010/0287346 A1 | 11/2010 | Schreter |
| 2011/0258178 A1 | 10/2011 | Eidson et al. |
| 2011/0258179 A1 | 10/2011 | Weissman et al. |
| 2011/0258225 A1 | 10/2011 | Taylor et al. |
| 2011/0282839 A1 | 11/2011 | Paksoy et al. |
| 2011/0295839 A1 | 12/2011 | Collins et al. |
| 2012/0036146 A1 | 2/2012 | Annapragada |
| 2012/0179762 A1 | 7/2012 | Arora et al. |
| 2012/0310878 A1 | 12/2012 | Vuksan et al. |
| 2014/0149400 A1 | 5/2014 | Fu et al. |
| 2014/0164318 A1 | 6/2014 | Tsai et al. |
| 2014/0172914 A1 | 6/2014 | Elnikety et al. |
| 2014/0337276 A1 | 11/2014 | Iordanov |
| 2015/0134626 A1 | 5/2015 | Theimer et al. |

OTHER PUBLICATIONS

Erickson, Gail, Lubor Kollar, and Jason Ward. "Improving Performance with SOL Server 2000 Indexed Views." Microsoft Tech Net, Sep (2000), (Year: 2000).

Final Office Action for U.S. Appl. No. 14/133,431 dated Apr. 22, 2016, 15 pages.

Final Office Action for U.S. Appl. No. 14/133,431 dated Aug. 25, 2017, 19 pages.

Final Office Action for U.S. Appl. No. 14/542,342 dated Aug. 28, 2017, 8 pages.

Final Office Action for U.S. Appl. No. 14/542,342 dated Dec. 11, 2018, 5 pages.

Final Office Action for U.S. Appl. No. 14/542,348 dated Sep. 25, 2017, 18 pages.

Final Office Action for U.S. Appl. No. 14/542,353 dated Oct. 23, 2017, 11 pages.

Final Office Action for U.S. Appl. No. 14/542,353 dated Sep. 14, 2018, 13 pages.

Final Office Action for U.S. Appl. No. 14/542,353 dated Sep. 9, 2019, 13 pages.

Final Office Action for U.S. Appl. No. 14/542,357 dated Feb. 27, 2018, 12 pages.

Final Office Action for U.S. Appl. No. 14/542,357 dated May 4, 2017, 13 pages.

Final Office Action for U.S. Appl. No. 14/542,338 dated Nov. 6, 2017, 17 pages.

Final Office Action for U.S. Appl. No. 14/542,338 dated Sep. 7, 2018, 18 pages.

Non-Final Office Action for U.S. Appl. No. 14/133,431 dated Aug. 26, 2015, 13 pages.

Non-Final Office Action for U.S. Appl. No. 14/133,431 dated Feb. 13, 2017, 16 pages.

Non-Final Office Action for U.S. Appl. No. 14/133,431 dated Feb. 26, 2018, 18 pages.

Non-Final Office Action for U.S. Appl. No. 14/133,431 dated Oct. 5, 2018, 21 pages.

Non-Final Office Action for U.S. Appl. No. 14/542,342 dated Jan. 9, 2017, 6 pages.

Non-Final Office Action for U.S. Appl. No. 14/542,342 dated May 14, 2018, 5 pages.

Non-Final Office Action for U.S. Appl. No. 14/542,348 dated Feb. 15, 2017, 13 pages.

Non-Final Office Action for U.S. Appl. No. 14/542,353 dated Apr. 4, 2017, 12 pages.

Non-Final Office Action for U.S. Appl. No. 14/542,353 dated Mar. 22, 2019, 15 pages.

Non-Final Office Action for U.S. Appl. No. 14/542,353 dated Mar. 9, 2018, 11 pages.

Non-Final Office Action for U.S. Appl. No. 14/542,357 dated Aug. 28, 2017, 12 pages.

Non-Final Office Action for U.S. Appl. No. 14/542,357 dated Jan. 9, 2017, 10 pages.

Non-Final Office Action for U.S. Appl. No. 16/112,538 dated Sep. 16, 2019, 23 pages.

Non-Final Office Action for U.S. Appl. No. 14/542,338 dated Feb. 1, 2017, 14 pages.

Non-Final Office Action for U.S. Appl. No. 14/542,338 dated Mar. 13, 2018, 24 pages.

Notice of Allowance for U.S. Appl. No. 14/133,431 dated Jun. 13, 2019, 14 pages.

Notice of Allowance for U.S. Appl. No. 14/542,342 dated May 22, 2019, 7 pages.

Notice of Allowance for U.S. Appl. No. 14/542,348 dated May 9, 2018, 9 pages.

Notice of Allowance for U.S. Appl. No. 14/542,357 dated Aug. 27, 2018, 9 pages.

Shook, Adam, and Donald Miner. MapReduce Design Patterns. "O'Reilly Media, Inc.", (2012): Chapter 4.

Non-Final Office Action for U.S. Appl. No. 16/553,067 dated May 13, 2021, 14 pages.

Notice of Allowance for U.S. Appl. No. 14/542,353 dated Dec. 18, 2019, 19 pages.

Notice of Allowance for U.S. Appl. No. 16/112,538 dated Jan. 8, 2020, 9 pages.

Notice of Allowance for U.S. Appl. No. 14/133,431 dated Sep. 24, 2019, 14 pages.

Non-Final Office Action for U.S. Appl. No. 16/853,572 dated Jul. 23, 2021, 23 pages.

Notice of Allowance for U.S. Appl. No. 16/553,067 dated Aug. 6, 2021, 8 pages.

Non-Final Office Action for U.S. Appl. No. 16/883,810 dated Jul. 9, 2021, 17 pages.

ASYNCHRONOUS SEARCH FOR BIG OBJECTS

CLAIM OF PRIORITY

This application is a continuation of, and claims priority to, U.S. patent application Ser. No. 14/542,342 entitled "ASYNCHRONOUS SEARCH FOR BIG OBJECTS," filed on Nov. 14, 2014, and is further related to, and claims priority to, provisional utility application No. 61/904,822 entitled "SCALABLE OBJECTS," filed on Nov. 15, 2013; provisional utility application No. 61/904,826 entitled "MULTI-TENANCY FOR A NOSQL DATABASE," filed Nov. 15, 2013; provisional utility application No. 61/905,439 entitled "BIG OBJECTS," filed Nov. 18, 2013; provisional utility application No. 61/905,457 entitled "ORCHESTRATION BETWEEN TWO MULTI-TENANT DATABASES," filed Nov. 18, 2013; and provisional utility application No. 61/905,460 entitled "FIELD HISTORY RETENTION," filed Nov. 18, 2013, the entire contents of which are all incorporated herein by reference.

TECHNICAL FIELD

Embodiments relate to management and search of large amounts of data. More particularly, embodiments relate to techniques searching large amounts of data.

BACKGROUND

Any subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

As service providers grow (in terms of numbers of customers and/or amount of customer data), data retention and management becomes more complex. With that growth comes the significant challenge of how to effectively and efficiently represent the increased volume of data. Object models and semantics that work at one level may not be effective with this growth. While the service provider is pushed to provide more suitable storage and/or semantics, customers want to continue to work within the same data model, platform and/or data accessibility. One particular aspect of this growth that is difficult to manage is the ability to quickly and effectively search large amounts of data.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
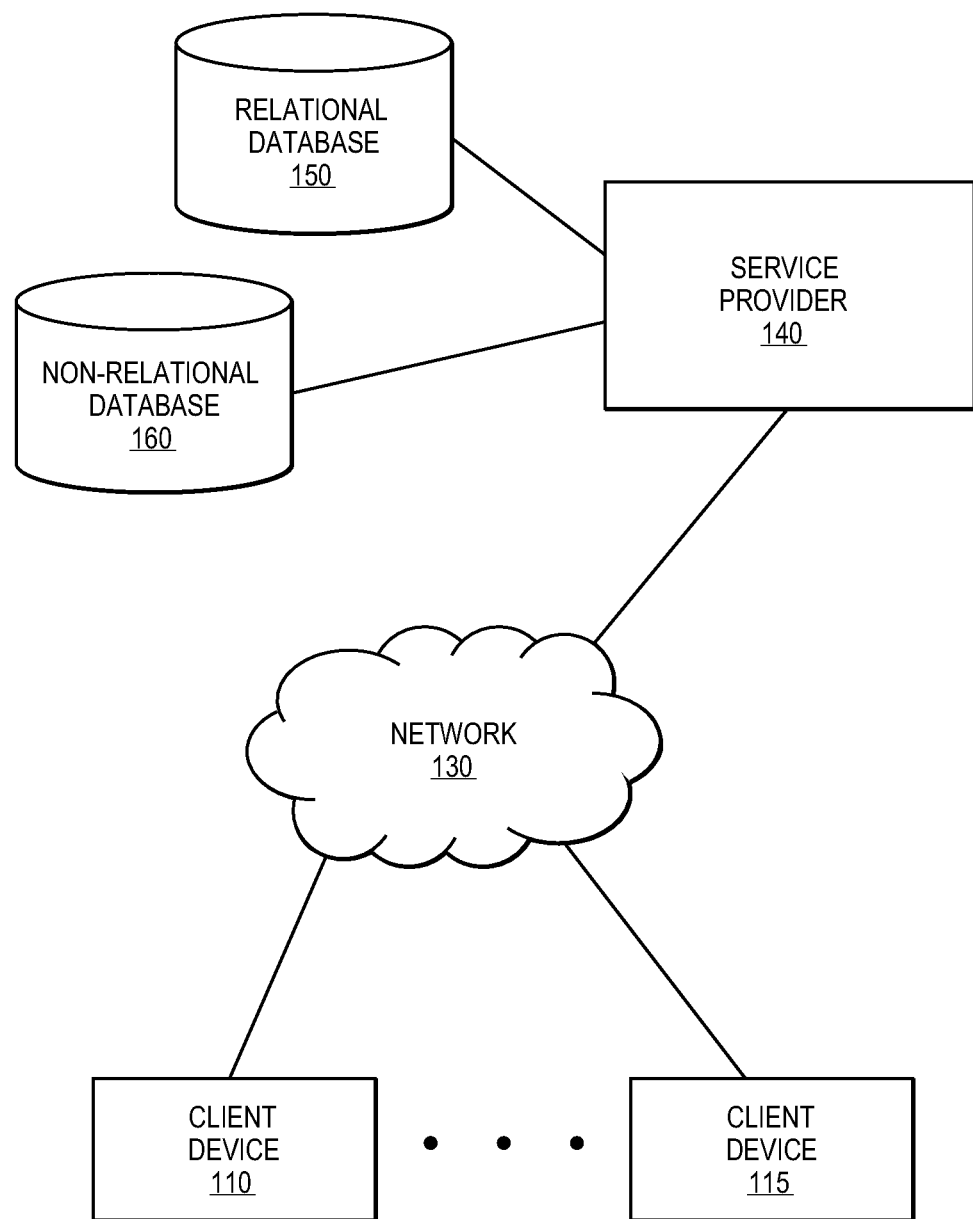
FIG. 1 is a block diagram of one embodiment of an architecture that may provide synchronously or asynchronously searchable big objects as described herein.

In the following description, numerous specific details are set forth. However, embodiments of the invention may be practiced without these specific details. In other instances, well-known circuits, structures and techniques have not been shown in detail in order not to obscure the understanding of this description.

For some on-demand services environments significant portions of data storage requirements can be used without using a relational database. However, a relational database may be needed for some data and/or may have been the basis for data when the services started. Data that does not require the relational database can be, for example, data that does not change over time, thus not requiring the ACID (Atomicity, Consistency, Isolation, Durability) properties of the relational database. In one embodiment, a new object type (sometimes referred to herein as a "big" object) is provide that can "unhook" customers/tenants/organizations from these constraints when it is desirable and/or appropriate to do so.

For a typical application of the big objects as described herein, a customer/client/tenant will have a large volume of data to be stored, the data is historical in nature (can be considered immutable) and access to the data can be controlled by simple accessibility rules, and native platform sharing is not required. Use of the big objects as described herein can be accomplished with different types of data as well.

The techniques herein allow customers/tenants/organizations to be unleashed from data limits that could interfere with application effectiveness. The Big Object feature set asserts a differentiating primitive—it allows customers/tenants/organizations to think at scale from the inception of their data, but also that these objects are conceived and used independent of the functional expectations and feature set of traditional base platform and custom objects.

In one embodiment, the big objects utilize frameworks such as the Metadata API from salesforce to push data to a NoSQL database such as HBase where vast amounts of data can quickly be analyzed, yet the system still provides the same functionality as a SQL, or Salesforce Object Query Language (SOQL) server, in terms of allowing queries and other features to be implemented on the data. In one embodiment, the multitenant environment can support synchronous real-time (or near real-time) searches of these big objects (e.g., SOQL). In one embodiment, if the system determines that the search will take too long (e.g., greater than 2 minutes, greater than 30 seconds, greater than one hour), the search can be converted to an asynchronous (non-real-time) search as described in greater detail below.

Once created and populated, a big object, the data, in one implementation, is immutable—it cannot change its current form. Yet, the data has full API and SOQL access from the platform. Data immutability can force a consciousness on users to take a more prescriptive look on the data they have on the platform, which objects contain data that needs to change on a frequent basis, and which data does not need to change.

In one embodiment, data mutations utilize a copy. In one embodiment, should any change in the data be required, the system can generate a superset or subset of data from one or more big objects. Customers/tenants/organizations are free to create as many big objects of any size as they need.

Rather than having customers/tenants/organizations restrain their thinking as to how much data should or could have on a platform, the system (by utilizing big objects) eliminates many boundaries to this thinking. By allowing customers/tenants/organizations to operate in terms of the how valuable this data is to them on a time basis, this allows for a good fit with immutable data—therefore the system allows the customer/tenant/organization to define the importance of their data based on how long they want to keep it.

In one embodiment, creating big objects can be available via typical user interface techniques, for example, using the custom object wizard experience, customers are free to define the full range field types, but with no limits to how many fields they define, or the data types they can use. In one embodiment, big objects, when created, are typically empty, and they can be populated with data from, for example, the current CRM database from the following sources: by creating clones of BPOs or custom objects, and/or by mapping fields from BPOs/custom object to a new big object, and orchestrating data across with a timeline or other criteria. Big objects can also be populated from third-party sources, for example, via structured Data Ingest using our Bulk API and/or Data Loader where very large third-party data that is structured can be mapped to one or more big objects.

In one embodiment, data that is encapsulated by a big object may by definition not be sharable. In one embodiment, establishing and maintaining visibility to this data is controlled using a set of reference and custom permission sets. In one embodiment, data in a big object is by definition is immutable, so features that rely on a material data change to function may by definition be unavailable to big objects.

One tenant of big objects is that the mechanism allows platform to manage large amounts of data, and provide the associated capabilities with these objects without data storage costs or scale being a consideration for the customer. Instead, the anticipated model may focus more on which objects are more important to retain for longer—on a per big object basis a customer may be able to set a retention policy that governs how long this data must be stored.

In one embodiment, queries (e.g., SOQL queries) can be executed synchronously if the query can be completed within a pre-selected period of time. In one embodiment, if queries cannot be completed within the pre-selected period of time, the query can be completed asynchronously. In one embodiment, a user is notified if the query cannot be completed within the pre-selected time and will be performed asynchronously. In one embodiment, the user can decide to accept the asynchronous operation or to change the query.

FIG. 1 is a block diagram of one embodiment of an architecture that may provide synchronously or asynchronously searchable big objects as described herein. In one embodiment, client devices are used by one or more users to access services from a service provider. The service provided can be, for example, an on-demand services environment, a multitenant database environment, or any other type of service provider.

Client devices 110 and 115 operate to allow a user to access remote services provided by service provider 140 via network 130. Client devices 110 can be, for example, desktop computers, laptop computers, tablets, smart phones, thin clients, etc. Network 130 can be any network, for example, the Internet, a corporate local area network or wide area network, a cellular network, and/or any combination thereof.

Service provider 140 can be any number of servers and/or other devices that operate to provide services to one or more client devices. In one embodiment, service provider 140 operates with one or more relational databases (e.g., 150) and one or more non-relational databases (e.g., 160). Service provider 140 operates using relational database 150 and non-relational database 160 as described above.

In one embodiment, service provider 140 is an on-demand services environment with multiple client organizations that provides different and/or different levels of services to the client organizations. For example, service provider 140 can be a multitenant database environment that provides custom interfaces and data isolation to the different client organizations. In the example, multitenant database environment, the utilization of relational database 150 and non-relational database 160 can be on an organization-by-organization basis with different parameters and/or conditions for different organizations.

In one embodiment, service provider 140 operates using relational database 150 to provide custom objects, which are custom database tables that allow a customer/tenant/organization to store information unique to the customer/tenant/organization. For example, an organization may create a custom object called "Quotes" to store data for the organization s sales quotes. The custom object can be used to, for example, create custom fields, associate the custom object with other records and display the custom object data in custom related lists, track tasks and events for custom object records, build page layouts, customize search results and the custom object fields that display them, create reports and dashboards to analyze custom object data, import custom object records.

In one embodiment, service provider 140 operates using non-relational database 160 to provide big objects as described above. The big objects can provide most or nearly all of the functionality of a custom object with increased scalability because non-relational database 160 can provide better scalability than relational database 150.

A query can be sent to service provider 140 over network 130 from a client device (e.g., 110, 115). Query languages for relational databases and for non-relational databases are different because different formats are used for the different database types. However, when utilizing a service environment in which both types of databases are used, it is more efficient and convenient for users to be able to use a single query type. In one embodiment, users can write/submit queries using a high-speed query language that can provide synchronous results, but if the database management systems determine that the query will be too time consuming to provide synchronous results, the query can be run asynchronously.

Using a specific example, service provider 140 can be a multitenant environment that utilizes relational database 150 (e.g., Database 12c available from Oracle®, DB2 available from IBM®, ACCESS available from Microsoft®) as well as non-relational database (e.g., HBase available from Apache Software Foundation, BigTable available from Google®). A user may provide a query utilizing one of various query languages (e.g., SOQL, SQL) through a client device.

Figure 2:
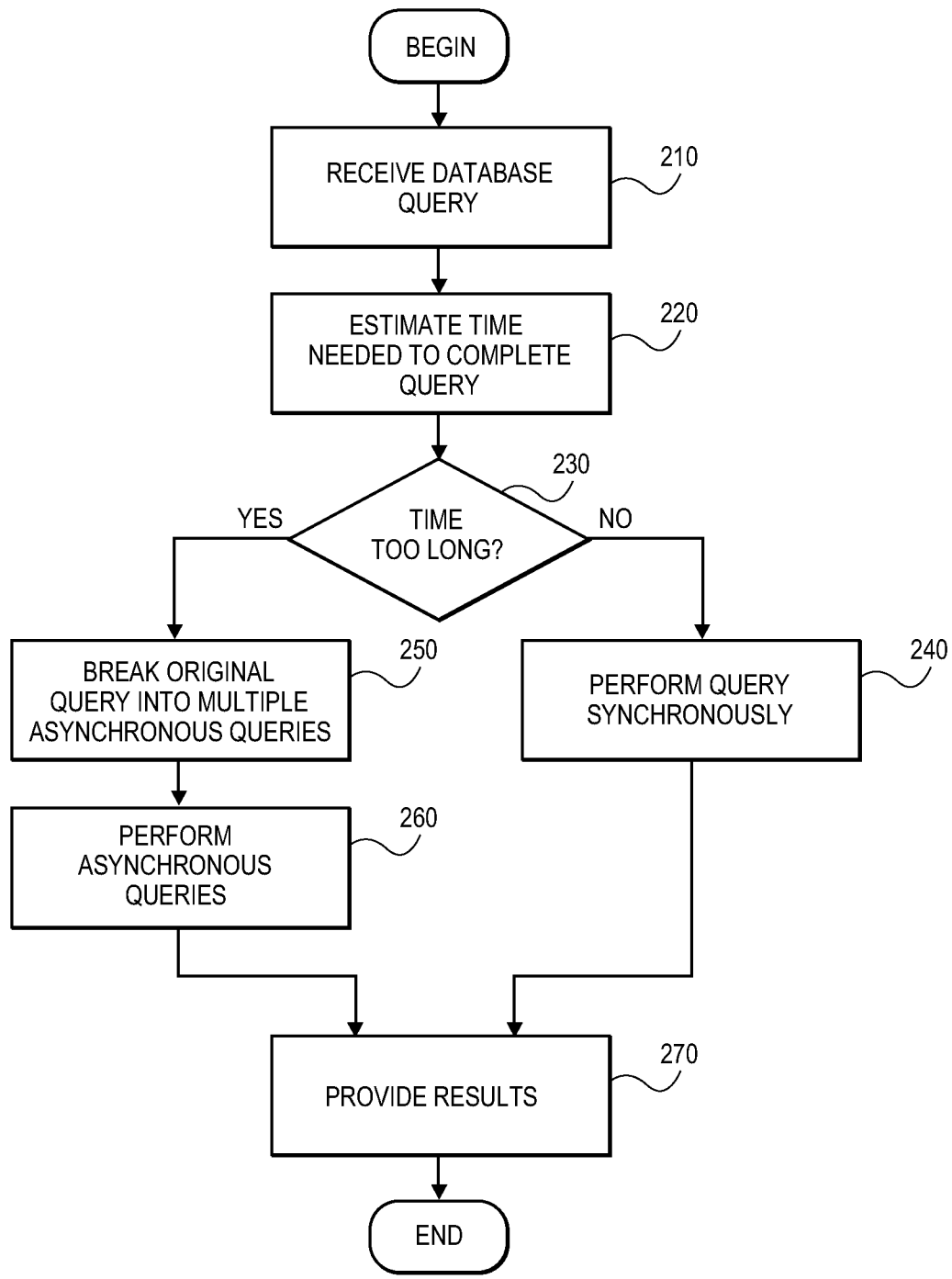
FIG. 2 is a flow diagram of one embodiment of a technique for performing a search in a database environment.

FIG. 2 is a flow diagram of one embodiment of a technique for performing a search in a database environment. Many of the examples provided herein involve multitenant environments; however, the techniques described herein can also be performed in non-multitenant environments. For example, a single tenant (or single entity) database environment can include both relational and non-relational database systems and can provide the search operations described herein.

In one example environment, SOQL with Phoenix delivers a real-time query experience on top of HBase. However, the experience rapidly degrades when Phoenix traverses rows that are not indexed, or when the dataset becomes very large. Technologies such as Hive front HBase data with a SQL, map-reduce functionality that offer more batch, and asynchronous response times. Furthermore, Phoenix is highly tuned for very specific access paths, and is not ideally suited for complex queries.

Platform developers therefore need to not be exposed to this variability in data availability and querability, and this can be provided by various embodiments that provide surfacing a consistent SOQL layer and under the covers use Phoenix and Hive as appropriate. One advantage provided is the abstraction across real-time and batch (MapReduce) driven data access, so platform developers can think in terms of a consistent query language, therefore exposing platform developers to significantly larger data sets. While the following examples are provided in terms of SOQL, other query languages can be supported in a similar manner.

In one embodiment, the techniques described herein support joins, filtering and/or grouping over non-indexed data. In the examples herein, the input query is a SOQL query and the API verb "AsynchQuery" is used for converted, asynchronous query. Other query languages can also be supported and other API verbs can be utilized. In one embodiment, the output is the name of a big object holding results and an asynchronous query job identifier (AsyncQueryID) that can be used, for example, to track job status. In one embodiment, the results are piped into a temporary big object with a shape determined by the query.

An original database query (e.g., SOQL query) is received, 210. The query can be generated and/or transmitted in any manner known in the art. In one embodiment, the database query is received from a client device; however, other configurations can also be supported. In one embodiment, the database (or service provider 140) can estimate the length of time required to perform the query, 220. In one embodiment, the system has a pre-selected time (e.g., 10 seconds, 30 seconds, 2 minutes, 5 minutes) that corresponds to a query taking too long.

If the original query will not take too long, 230, the original query is performed synchronously, 240. This is the "normal" or standard operation for query operation because the system can provide fast enough results. If the original query will take too long, 230, the original query is broken into multiple asynchronous queries, 250. In one embodiment, the system provides feedback to the requesting device that the conversion has been made.

The asynchronous queries are performed, 260. In one embodiment, two or more asynchronous queries can be performed in parallel. The following is an example of an asynchronous query:

/services/data/v32.0/asyncQuery?q=select id, oldvalue, newvalue, field from FieldHistoryArchive where createdBy.FirstName='Eli'

As discussed above, "asyncQuery" is API verb used in the asynchronous query. In the example above, "FieldHistoryArchive" is the select from big object. In the example above, "createdBy" is the cross-store join to the user object. In the example above, "FirstName='Eli'" is the filter on field of the joined object.

The following is an example asynchronous query result:

```
{
"asyncQueryJobId" : "0NOxx000000003K",
"resultSObjectName" : "AsyncQueryResults123_b"
}
```

In the example result above, "asynchQueryJobId" is the query/job identifier that can be used to track progress. In the example result above, "resultSObjectName" is the name of the big object that will hold the query results.

Results are provided, 270. In one embodiment, the results provided are the same format/style/etc. whether a synchronous query or an asynchronous query is performed. Thus, the user can write/submit a query and not have to be concerned about how the query is performed.

Figure 3:
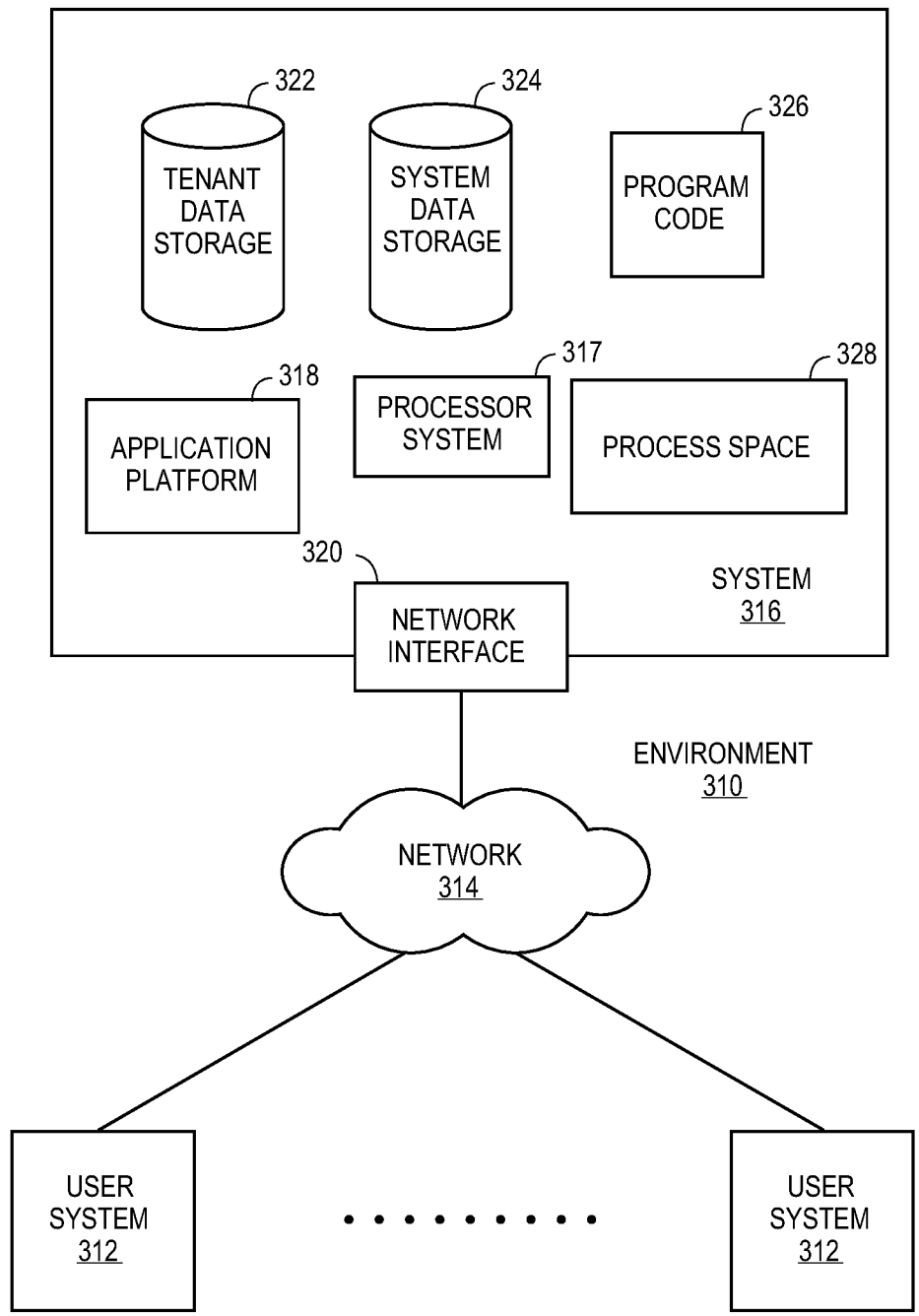
FIG. 3 illustrates a block diagram of an environment where an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in herein FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
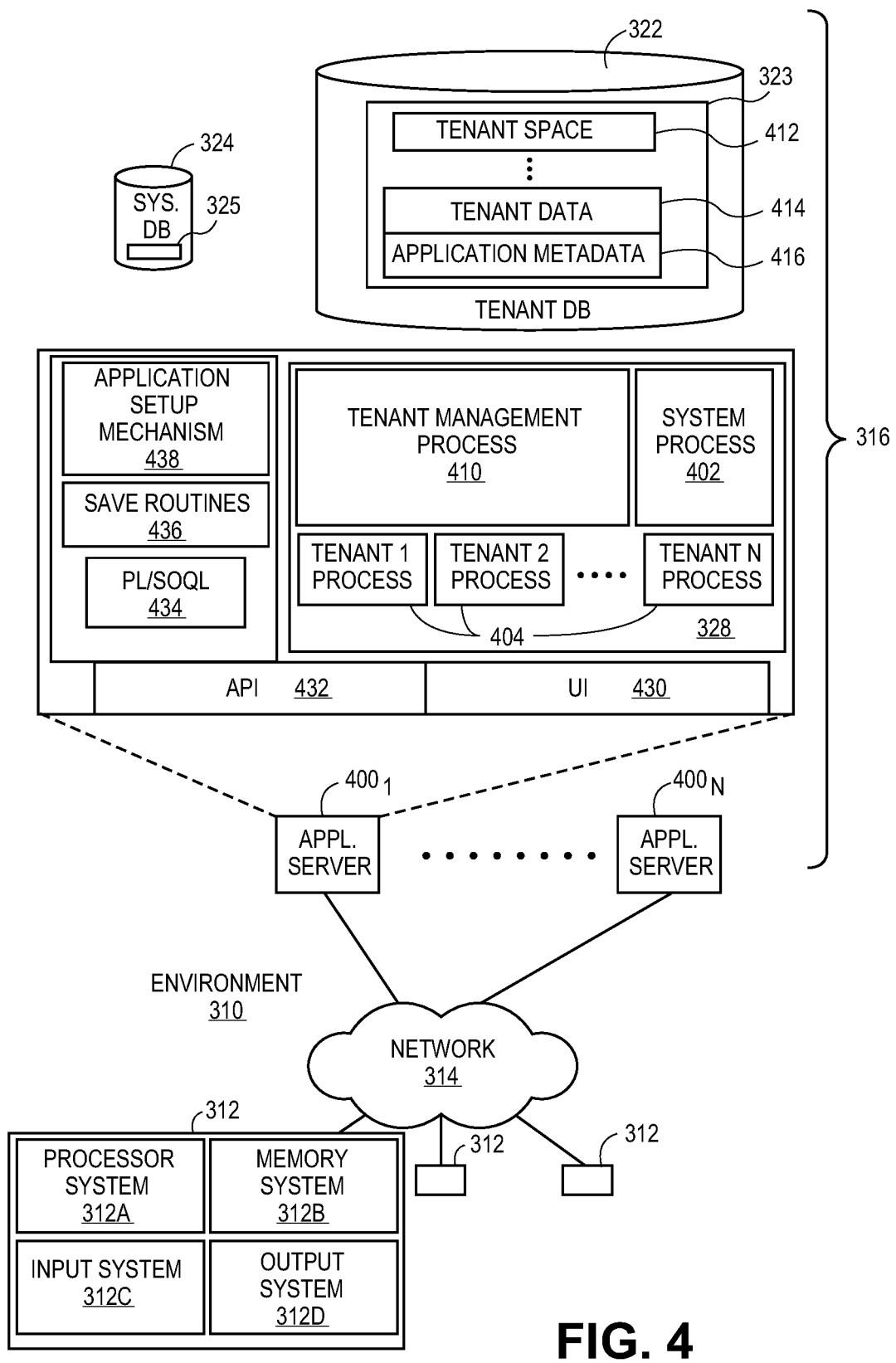
FIG. 4 illustrates a block diagram of an environment where an on-demand database service might be provided.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method, comprising:
    receiving, by one or more servers, an original database query in a query language targeted to a relational database system;
    estimating, by the one or more servers, a time to complete a non-relational database query corresponding to the original database query;
    determining, by the one or more servers, whether the estimated time is less than a pre-defined threshold;
    performing, by the one or more servers in real-time, at least one database query corresponding to at least a first part of the original database query on a non-relational database using a query language targeted to the non-relational database for data in the non-relational database either synchronously or asynchronously according to a result of whether the estimated time is less than a pre-defined threshold, wherein the at least one database query is performed synchronously if the estimated time is less than the predefined threshold;

obtaining a result of performing the at least one query; and providing the result responsive to the original database query.

2. The method of claim 1, further comprising:
storing the result in an object.

3. The method of claim 1, wherein the at least one database query is performed on the non-relational database as a set of parallel scans.

4. The method of claim 1, wherein the at least one database query is performed on the non-relational database as a set of non-parallel scans where at least onescan is performed not in parallel with other scans.

5. The method of claim 1, wherein the original database query isdirected to data stored in both a relational database system and the non-relational database system.

6. The method of claim 5, wherein the relational database system and the non-relational database system are both part of a multitenant on-demand servicesenvironment.

7. A system, comprising:
one or more processors;
a database system configurable to cause via the one or more processors:
obtaining an original database query in a query language targeted to a relational database system;
estimating a time to complete a non-relational database query corresponding to the original database query;
determining whether the estimated time is less than a pre-defined threshold;
performing, in real-time, at least one database query corresponding to at least a first part of the original database query on a non-relational database using a query language targeted to the non-relational database for data in the non-relational database either synchronously or asynchronously according to a result of whether the estimated time is less than a pre-defined threshold, wherein the at least one database query is performed synchronously if the estimated time is less than the predefined threshold;
obtaining a result of performing the at least one query; and
providing the result responsive to the original database query.

8. The system of claim 7, the database system further configurable to cause:
storing the result in an object.

9. The system of claim 7, wherein the at least one database query isperformed on the non-relational database as a set of parallel scans.

10. The system of claim 7, wherein the at least one database query is performed on the non-relational database as a set of non-parallel scans where at least onescan is performed not in parallel with other scans.

11. The system of claim 7, wherein the original database query is directed to data stored in both a relational database system and the non-relational database system.

12. The system of claim 11, wherein the relational database system and the non-relational database system are both part of a multitenant on-demand servicesenvironment.

13. A non-transitory computer-readable medium having stored thereon instructions that, when executed by one or more processors cause the one or more processors to:
obtain an original database query in a query language targeted to a relational database system;
estimate a time to complete a non-relational database query corresponding to the original database query;
determine whether the estimated time is less than a pre-defined threshold;
perform, in real-time, at least one database query corresponding to at least a first part of the original database query on a non-relational database using a query language targeted to the non-relational database for data in the non-relational database either synchronously or asynchronously according to a result of whether the estimated time is less than a pre-defined threshold, wherein the at least one database query is performed synchronously if the estimated time is less than the predefined threshold;
obtain a result of performing the at least one query;
provide the result responsive to the original database query.

14. The non-transitory computer-readable medium of claim 13, wherein the at least one database query is performed on the non-relational database as a set of parallel scans.

15. The non-transitory computer-readable medium of claim 13, wherein the at least one database query is performed on the non-relational database as a set of non-parallel scans where at least one scan is performed not in parallel with other scans.

16. The non-transitory computer-readable medium of claim 13, wherein the original database query is directed to data stored in both a relational databasesystem and the non-relational database system.

17. The non-transitory computer-readable medium of claim 16, wherein the relational database system and the non-relational database system are both part of a multitenant on-demand services environment.

18. The non-transitory computer-readable medium of claim 13, the relational database including data stored in a custom object.

19. The method of claim 1, wherein the at least one database query is performed in real-time if the estimate time is less than the predefined threshold.

20. The method of claim 1, further comprising:
if the estimated time is greater than the predefined threshold, generating two or more queries from the original database query, wherein performing that least one database query includes executing the two or more database queries asynchronously.

21. The system of claim 7, the database system further configurable to cause:
if the estimated time is less than the predefined threshold, performing the at least one database query in real-time synchronously.

* * * * *